Figure 1:
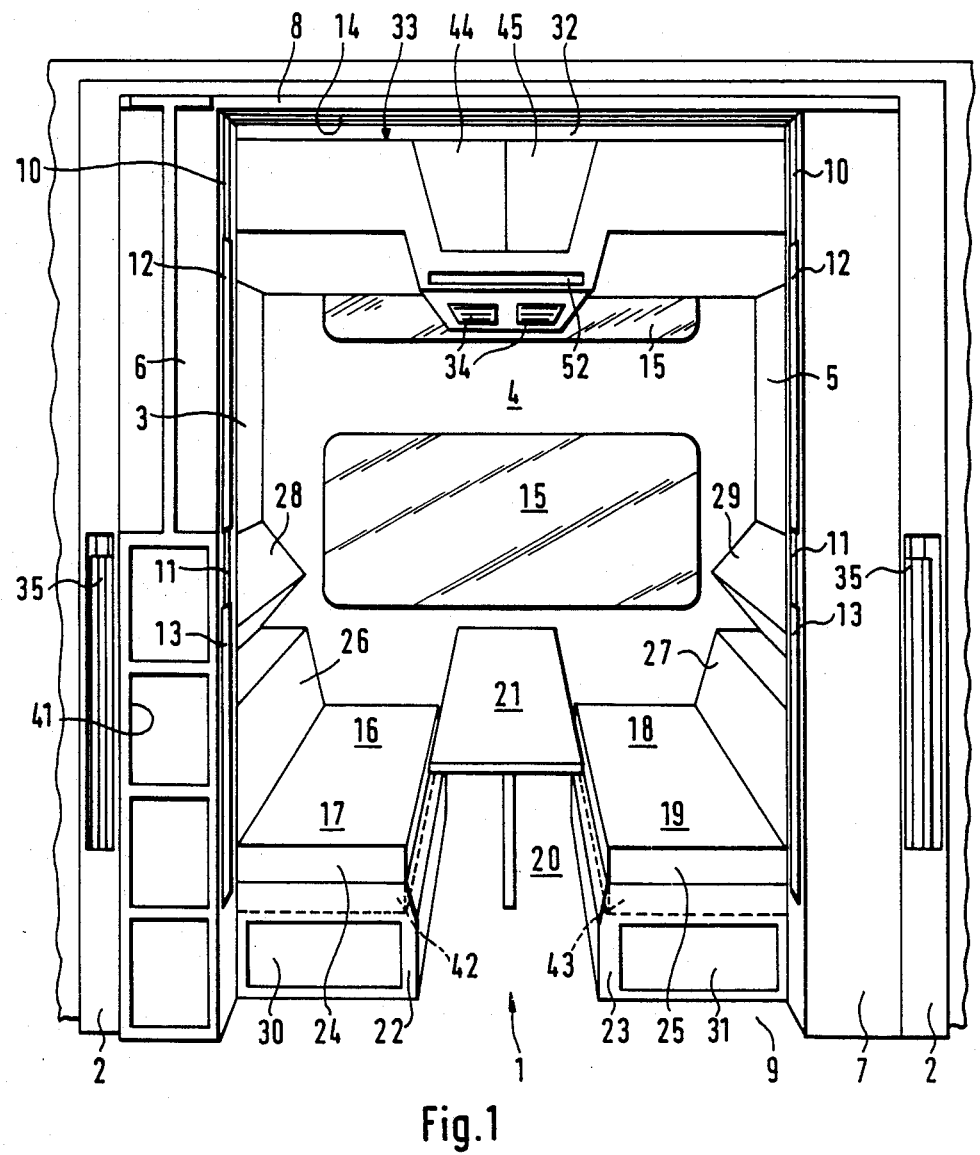

United States Patent [19]

Platzer

[11] Patent Number: 4,854,245
[45] Date of Patent: Aug. 8, 1989

[54] ARRANGEMENT FOR INCREASED PASSENGERS UTILIZATION IN MOBILE UNITS

[76] Inventor: Wolfgang P. Platzer, Hedströmsgatan 1, Helsingborg, Sweden, S-252 51

[21] Appl. No.: 122,137

[22] Filed: Nov. 18, 1987

[30] Foreign Application Priority Data

Dec. 30, 1986 [SE] Sweden ............................. 8605623

[51] Int. Cl.$^4$ .............................................. B61D 1/08
[52] U.S. Cl. ................................... 105/317; 105/340; 105/345
[58] Field of Search ............... 105/345, 344, 334, 335, 105/340, 314, 315, 316, 317, 321; 296/174, 156

[56] References Cited

U.S. PATENT DOCUMENTS

| | | | |
|---|---|---|---|
| 21,436 | 9/1858 | Myers et al. | 105/317 |
| 97,031 | 11/1869 | Blood | 105/317 |
| 242,801 | 6/1881 | Starr | 105/317 |
| 716,854 | 12/1902 | Batterson | 105/317 |
| 2,156,229 | 4/1939 | Ragsdale | 105/317 |
| 2,632,183 | 3/1953 | Patton et al. | 105/317 |
| 2,778,320 | 1/1957 | Austgen et al. | 105/317 |
| 2,963,988 | 12/1960 | Murphy | 105/345 |
| 2,983,230 | 5/1961 | Murphy | 105/345 |
| 4,179,996 | 12/1979 | Gutridge et al. | 105/345 |

*Primary Examiner*—Richard A. Bertsch
*Attorney, Agent, or Firm*—Bacon & Thomas

[57] ABSTRACT

This invention relates to an arrangement permitting passengers in mobile units, such as coaches or trains, to stay both by day and by night in a lower and an upper one of two superposed passenger accommodations (1a, 1b) that are formed by one passenger accommodation (1) being converted into the two superposed passenger accommodations (1a, 1b) by the lowering of a ceiling element (33) which is arranged in a raisable and lowerable fashion in the passenger accommodation (1). To permit enhanced utilization of both the lower and the upper passenger accommodations (1a, 1b) by day as well as by night, the ceiling element (33) comprises at least one seat (36–39) which is convertible into at least one berth.

10 Claims, 4 Drawing Sheets

ARRANGEMENT FOR INCREASED PASSENGERS UTILIZATION IN MOBILE UNITS

This invention relates to an arrangement permitting passengers in mobile units, such as coaches or trains, to stay both by day and by night in a lower and an upper one of two superposed passenger accommodations that are formed by one passenger accommodation being converted into the two superposed passenger accommodations by the lowering of a ceiling element which is arranged in a raisable and lowerable fashion in the passenger accommodation.

With arrangements of this type, it has not hitherto been possible to use the lower and upper passenger accommodations in an appropriate way both by day and by night, and neither have any solutions of this problem been suggested in publications in the field concerned, for instance U.S. Pat. Nos. 940,383, 2,156,229 and 2,278,320.

The object of the present invention is to solve the problem outlined above and to provide, by simple means, an arrangement in which the lower as well as the upper passenger accommodation can be exploited to a substantially higher extent than earlier both by day and by night.

This object is attained substantially in that the ceiling element comprises at least one seat which is convertible into at least one berth.

The arrangement according to the invention further makes it possible for passengers to be seated in the upper passenger accommodation and, if necessary, to convert the seat or seats into one or more berths or vice versa, whenever this is desired.

The invention will be more fully described in the following with reference to the accompanying drawings in which the Figures illustrate various alternatives of making use of passenger accomodations comprising an arrangement according to the invention.

FIG. 1 thus shows a perspective view of a passenger accommodation comprising an arrangement according to the present invention. The passenger accommodation is intended for a mobile unit, such as coaches or trains, and may be mounted therein as a separate prefabricated assembly or built directly thereinto. The passenger accommodation may be designed for two, four or possibly more passengers. The embodiment illustrated, however, is intended for four passengers.

Both in the prefabricated embodiment and when built directly into for instance the train or coach, the passenger accommodation 1 is defined by a frame consisting of corner posts 2 and wall sections 3, 4 and 5 mounted therebetween. On the fourth side there is defined, between two lateral beams 6 and 7, a beam 8 disposed thereon and the floor 9 of the accommodation, an opening which leads into the passenger accommodation 1 and is adapted to be closed with the aid of sliding doors 10 and 11 that can be moved aside into inner spaces in the lateral beams. The sliding doors, i.e. at least one upper sliding door 10 and at least one lower sliding door 11, run when opened and shut in upper and lower guide rails 12 and 13, respectively, which are also retractible into the lateral beams 6, 7. The upper beam 8, too, comprises a support guide rail 14 for the upper sliding door 10. The wall section 4 facing the opening leading into the passenger accommodation 1 has one or more openings 15 for windows adapted to the windows of the coach or railway car in which the assembly is to be mounted. When built directly into the coach or railway car, it is also conceivable for the wall section 4 to be formed by part of the side of the coach or railway car.

In the embodiment illustrated, there are formed on the floor 9 of the passenger accommodation two seat surfaces each having two seats 16, 17 and 18, 19, respectively, on opposite sides of a legroom space 20. A table 21 is disposed between the seats 16, 17 and 18, 19, respectively, and fixed to the floor 9 in the legroom space 20. The seats 16, 17 and 18, 19, respectively are constituted by a seat support 22 and 23, respectively, on either side of the table 21, there being placed on each seat support a seat cushion for each seat or, as shown, seat mattresses 24 and 25, respectively, and a back-rest forming element 26 and 27, respectively. A headrest forming element 28 and 29, respectively, is also fixed to the wall section 3 and 5, respectively, over the respective seat support 22, 23. The seat supports 22, 23 further comprise inner spaces 30 and 31, respectively, for luggage, etc.

At the ceiling 32 of the passenger accommodation 1 there is suspended a ceiling element 33 which at the underside carries lamps 34, etc. The ceiling element 33 is mounted in raisable and lowerable fashion on preferably hydraulic lifting means 35 disposed in the corner posts 2. With the aid of said lifting means 35 the ceiling element 33 can be lowered for conversion of the passenger accommodation 1 into a lower passenger accommodation 1a and an upper passenger accommodation 1b.

When the ceiling element 33 is in its upper, raised position shown in FIG. 1, the passengers preferably four in number in the passenger accommodation 1 may each occupy one of the seats 16–19 e.g. for having a meal, for playing cards or for carrying on other activity, where a table is required, or merely for conversing.

Figure 2:
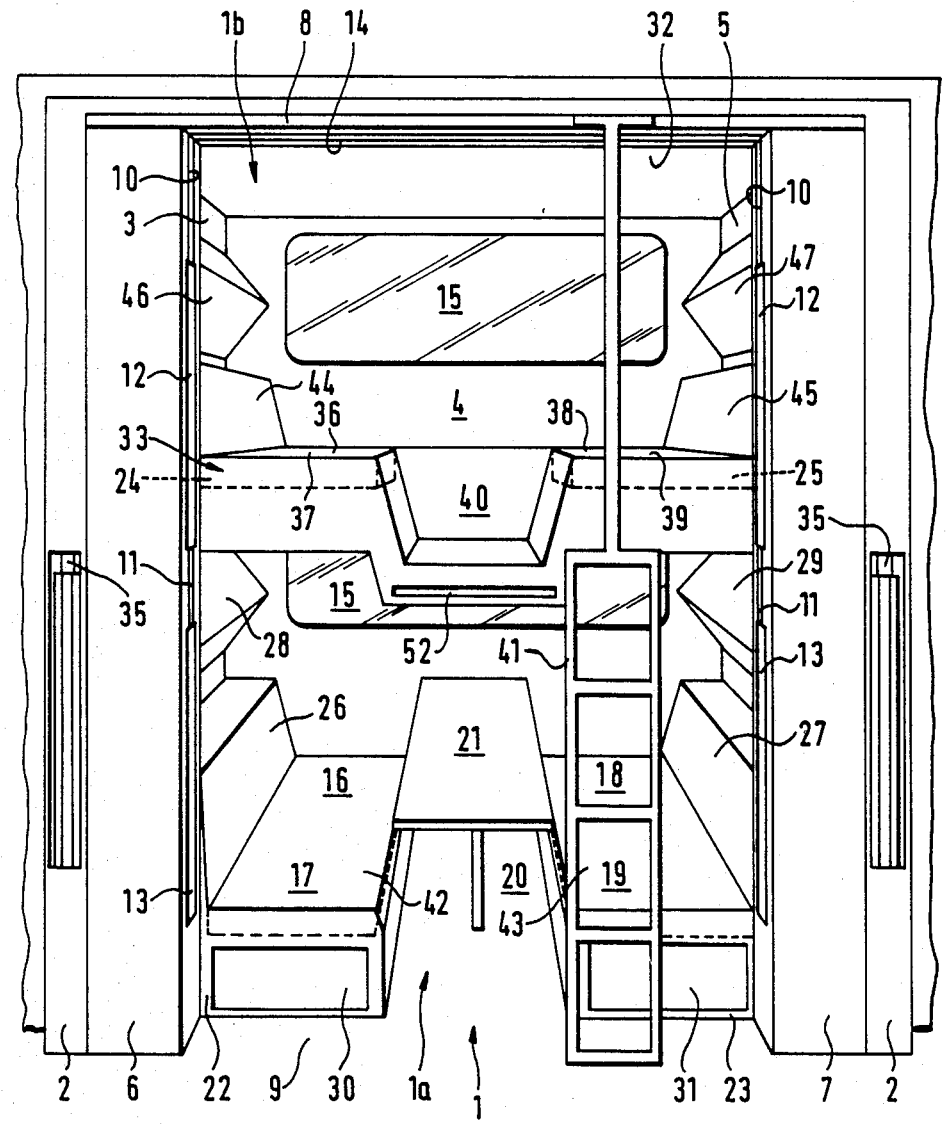

Should a passenger wish to read, listen to music or be alone, the ceiling element 33 is brought to the lower position shown in FIG. 2, whereby the two superposed passenger accommodations 1a, 1b are formed. According to the invention, the ceiling element 33 is in fact designed to comprise at least one seat, in the embodiment illustrated two seat surfaces with four seats: two seats 36, 37 and 38, 39, respectively, on opposite sides of a legroom space preferably formed by a recess 40 in the ceiling element 33. Thus, one or more passengers may retire to these upper seats 36–39 by climbing a ladder 41 which is slidably fastened to for instance the upper beam 8 and laterally movable along the opening leading to the passenger accommodation 1. To facilitate stepping into the upper passenger accommodation 1b the recess 40 is besides open at least at the end thereof facing the ladder 41.

After lowering of the ceiling element 33, the seat mattresses 24, 25 are removed, for space-saving purposes, from the respective lower seats 16, 17 and 18, 19, respectively, and placed on the upper seats 36, 37 and 38, 39, respectively. There then remain on the seats 16, 17 and 18, 19, respectively, two further seat mattresses 42 and 43, respectively. The sitting height in the lower passenger accommodation 1 will as a result be reduced, but the necessary height of head in sitting position will be obtained without any problem in both the lower and the upper passenger accommodation 1a, 1b by a further slight lowering of the ceiling element 33. Besides, like in the lower accommodation there are arranged in the upper accommodation 1b back-rest forming elements 44 and 45, respectively, for the seats 36, 37 and 38, 39, respectively on both sides of the legroom space 40, as well as head-rest forming elements 46 and 47, respectively, on the wall sections 3 and 5, respectively, above the seats.

With the ceiling element 33 in its lowered position, it is further possible for the four passengers for which the passenger accommodation 1 is intended, all to ride in the direction of travel.

Figure 3:
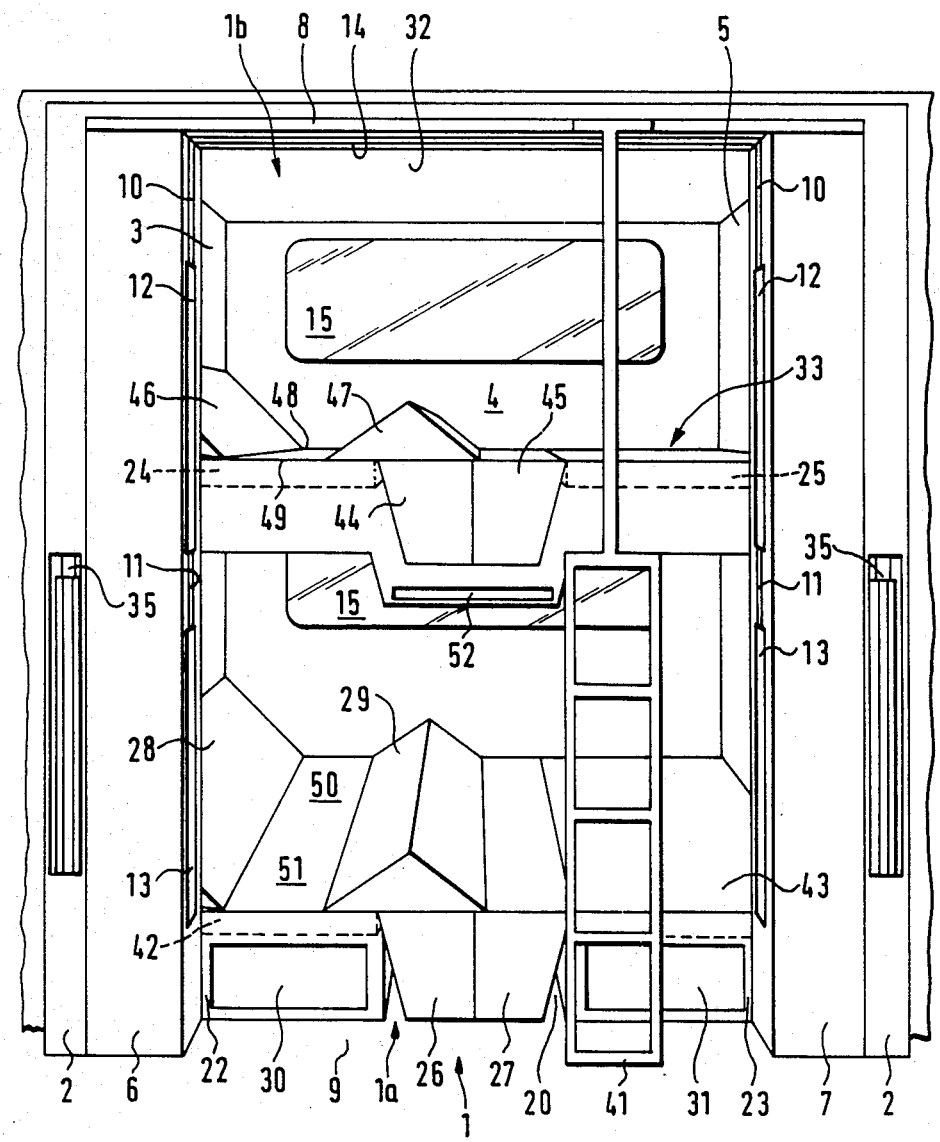
Figure 4:
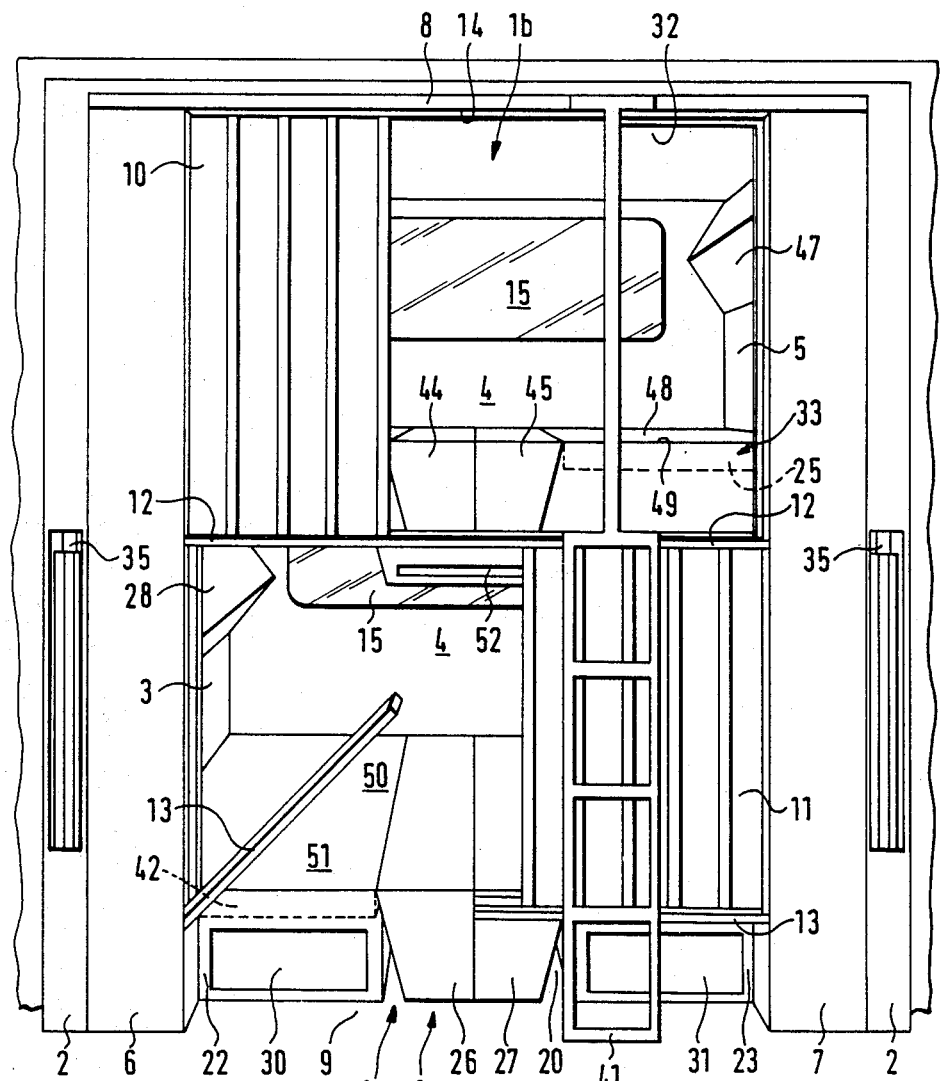

For resting in semi-recumbent position and for sleeping, the seat or, as in the embodiment illustrated, the seats 36–39 of the ceiling element 33 are convertible—according to the invention and as is seen from FIGS. 3 and 4—into at least one, in this instance two berths 48 and 49. Also the seats 16–19 in the lower passenger accommodation 1a are convertible into berths 50 and 51 (see FIGS. 3 and 4). The seats 16–19 and 36–39, respectively, are converted into the berths 50, 51 and 48, 49, respectively, in that at least one berth element is placed in and/or over the legroom spaces 20 and 40, respectively, pertaining to the seats. In the preferred embodiment shown in FIGS. 3 and 4 the conversion into berths is brought about in the lower passenger accommodation 1a in that the back-rest forming elements 26, 27 on the seats 16–19 are placed in the legroom space 20, and in the upper passenger accommodation 1b in that the back-rest forming elements 44, 45 on the seats 36–39 are placed in the recess 40 forming the legroom space, whereby the back-rest forming elements 26, 27 and 44, 45, respectively, thus serve as berth elements. The recess 40 in the ceiling element 33 for this purpose has been given a suitable shape adapted to the elements 44, 45. In addition, before the elements 26, 27 are placed in the legroom space 20, the table 21 has to be removed, which is done by unscrewing it and placing it in an inner space 52 in the ceiling element 33.

As will be seen from FIG. 3, to permit the passengers to occupy suitable, semi-recumbent positions of rest, the headrest forming elements, 28, 29 of the lower passenger accommodation 1a and the head-rest forming elements 46, 47 of the upper passenger accommodation 1b can now be placed on the berths 50, 51 and 48, 49 (into which the seats 16–19 and 36–39, respectively, have been converted) in order to form supporting elements for say the knees and back of the passengers in said positions of rest. Of course, these supporting elements may be arranged in any other suitable way, depending upon the position of rest taken.

In sitting position and rest position, but above all when someone wants to sleep, the guide rails 12, 13 may, if desired, be lowered as required and the sliding doors 10, 11 drawn to the extent desired in order to further increase the feeling of seclusion.

It will be obvious to those skilled in the art that the present invention can be modified and varied within the scope of the appendant claims without departing from the basic idea and object of the invention. As already mentioned, passenger accommodations, apart from the described embodiment for four passengers, can be designed, by exploiting the arrangement according to the invention, also for two passengers with two seats in the upper and lower accommodation, respectively, which permit being converted each into one berth. As far as available space permits, larger passenger accommodations may also be provided. The various alternatives described of exploiting the superposed passenger accommodations 1a, 1b moreover may be practised in any sequence whatever and independently of one another. Thus, one may sleep in the lower accommodation, closing it with the sliding door or doors 11, whereas one sits up or occupies a position of rest in the upper accommodation and for instance reads or looks out at the passing landscape. It should also be mentioned that the elements used for the conversion of the passenger accommodations 1a, 1b, the seat mattresses, etc. may vary in shape and number and be made of any suitable material, which also applies to the remaining arrangement.

I claim:

1. An arrangement for increased utilization of a passenger accommodation in a mobile unit, such as a coach or a train, during day and night, which arrangement comprises:
   (a) a ceiling element partially defining a passenger accommodation space, the ceiling element being moveable downwardly to a lower position for dividing the accommodation space into upper and lower compartments; and
   (b) the ceiling element including an upper legroom space formed therein and at least one upper seat, the upper seat including at least one upper berth element and being convertible into at least one upper berth in the upper compartment by disposing the upper berth element in the upper legroom space.

2. The arrangement of claim 1 wherein the upper seat is partially defined by the 3. The arrangement of claim 1 wherein the ceiling element includes two upper seats, with the upper legroom space being disposed between the two upper seats 4. The arrangement of claim 1 further including two upper seats, each upper seat including an upper berth element, and the upper berth elements being disposable within the upper legroom space to convert the upper seats into at least one upper berth.

5. The arrangement of claim 1 wherein the upper seat includes at least one upper head rest forming element disposable on the upper berth to define a supporting element for a passenger in a semi-recumbent position of rest.

6. The arrangement of claim 1 wherein the lower compartment includes a lower legroom space, two lower seats disposed on opposite sides of the lower legroom space, each lower seat including at least one lower berth element and one lower backrest forming element, and the lower berth elements being disposable within the lower legroom space to convert the lower seats into a lower berth.

7. The arrangement of claim 6 further including a lower headrest forming element disposable on the lower berth to form a supporting element for a passenger in a semi-recumbent position of rest.

8. The arrangement of claim 6 wherein each of the lower seats in the lower compartment includes a lower seat cushion, each lower seat cushion being detachable from its corresponding lower seat and disposable on the upper seat in the upper compartment.

9. The arrangement of claim 6 further including a detachable table between the lower seats, an inner space formed in the ceiling element and the table being disposable within the inner space.

10. The arrangement of claim 1 wherein the upper and lower compartments each includes means for seating passengers and are each of sufficient dimensions to permit simultaneous seating of passengers in both compartments.

* * * * *